US006973063B1

(12) United States Patent
Sourour

(10) Patent No.: US 6,973,063 B1
(45) Date of Patent: Dec. 6, 2005

(54) METHODS, SYSTEMS AND APPARATUS FOR PRECOMPENSATING FOR INTERFERENCE AMONG TRANSMITTED CODED SIGNALS

(75) Inventor: Essam Sourour, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/532,357

(22) Filed: Mar. 21, 2000

(51) Int. Cl.$^7$ .............................................. H04B 7/216
(52) U.S. Cl. ...................................... 370/335; 375/296
(58) Field of Search ................................ 370/335, 336, 370/320, 342, 318, 330, 203, 206, 209; 375/148, 375/340, 296, 142; 455/501, 504

(56) References Cited

U.S. PATENT DOCUMENTS

| | | | | |
|---|---|---|---|---|
| 5,740,165 A | * | 4/1998 | Vannucci | 370/330 |
| 5,805,567 A | * | 9/1998 | Ramesh | 370/204 |
| 5,852,405 A | * | 12/1998 | Yoneda et al. | 340/825.02 |
| 6,067,290 A | * | 5/2000 | Paulraj et al. | 370/329 |
| 6,067,291 A | * | 5/2000 | Kamerman et al. | 370/338 |
| 6,332,006 B1 | * | 12/2001 | Rydbeck et al. | 375/262 |
| 6,501,788 B1 | * | 12/2002 | Wang et al. | 375/148 |
| 6,515,980 B1 | * | 2/2003 | Bottomley | 370/342 |
| 6,671,266 B1 | * | 12/2003 | Moon et al. | 370/342 |
| 6,683,924 B1 | * | 1/2004 | Ottosson et al. | 375/343 |

FOREIGN PATENT DOCUMENTS

| | | |
|---|---|---|
| DE | 198 18 215 A1 | 11/1999 |
| WO | WO 99/49596 | 9/1999 |

OTHER PUBLICATIONS

International Search Report, PCT/US01/07523, Dec. 3, 2001.

"Introduction to cdma2000 Standards for Spread Spectrum Systems," PN-4427 (to be published as TIA/EIA/IS-2000-1), Ballot Resolution Version, Jul., 1999.

\* cited by examiner

Primary Examiner—Chau Nguyen
Assistant Examiner—Ricardo Pizarro
(74) Attorney, Agent, or Firm—Myers Bigel Sibley & Sajovec

(57) ABSTRACT

In a communications system such as a wireless code division multiple access (CDMA) communications system, an interference-compensated information symbol is generated from a source information symbol based on knowledge of an information symbol and a first code used to generate a first coded signal. The first coded signal and a second coded signal representing the interference-compensated information symbol encoded according to a second code are then concurrently transmitted. In one embodiment, a composite signal is generated from at least one information symbol according to at least one code from a first group of codes of a set of quasi-orthogonal codes. An interference-compensated information symbol is then generated from a source information symbol, the composite signal and a code from a second group of codes of the set of quasi-orthogonal codes. The second coded signal represents the interference-compensated information symbol encoded according to the code from the second group, and is transmitted concurrently with transmission of the first coded signal. Preferably, the interference-compensated information symbol is generated by integrating a product of the composite signal and the complex conjugate of the code from the second group over a symbol interval, scaling the integrated product by a scaling factor, and subtracting the scaled integrated product from the source information symbol to generate the interference-compensated information symbol.

36 Claims, 10 Drawing Sheets

METHODS, SYSTEMS AND APPARATUS FOR PRECOMPENSATING FOR INTERFERENCE AMONG TRANSMITTED CODED SIGNALS

BACKGROUND OF THE INVENTION

The present invention relates to communications systems and methods, and more particularly, to communications systems and methods in which signals are transmitted using codes.

Wireless communications systems are commonly employed to provide voice and data communications to subscribers. For example, analog cellular wireless communications systems, such as those designated AMPS (Advanced Mobile Phone System), NMT(Nordic Mobile Telephone)-450 and NMT-900, have long been deployed successfully throughout the world. Digital cellular wireless communications systems such as those conforming to the North American standard IS-54 and the European standard GSM (Global Systems for Mobile Communications) have been in service since the early 1990's. More recently, a wide variety of wireless digital services broadly labeled as PCS (Personal Communications Services) have been introduced, including advanced digital cellular systems conforming to standards such as TIA/EIA-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular wireless communication system 20. The cellular wireless communications system 20 may include one or more terminals 22, such as mobile terminals, radiotelephones or similar devices, communicating with a plurality of cells 24 served by base stations 26 and a mobile telephone switching office (MTSO) 28. Although only three cells 24 are shown in FIG. 1, a typical cellular system may include hundreds of cells, may include more than one MTSO, and may serve thousands of terminals.

The cells 24 generally serve as nodes in the communication system 20, from which links are established between terminals 22 and the MTSO 28, by way of the base stations 26 serving the cells 24. Each cell 24 typically has allocated to it one or more dedicated control channels and one or more traffic channels. A control channel is a dedicated channel used for transmitting cell identification and paging information. The traffic channels carry the voice and data information. Through the cellular system 20, a duplex radio communication link may be effected between two mobile terminals 22 or between a mobile terminal 22 and a landline telephone user 32 through a public switched telephone network (PSTN) 34. The function of the base station 26 is to handle radio communication between a cell 24 and mobile terminals 22. In this capacity, the base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite wireless communications system 40 typically includes one or more satellites 42 (one shown) that serve as relays or transponders between one or more earth stations 44 (one shown) and terminals 23, which may be mobile terminals, radiotelephones or the like. The satellite 42 conveys information over duplex links 46 to the terminals 23 and an earth station 44. The earth station 44 may in turn be connected to a public switched telephone network 34, allowing communications between terminals 23, and communications between satellite terminals 23 and conventional terrestrial terminals or landline telephones. The satellite wireless communications system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. Traditional analog cellular systems generally employ a system referred to as frequency division multiple access (FDMA) to create communications channels, while more modern digital wireless systems may use multiple access techniques such as time division multiple access (TDMA) and/or code division multiple access (CDMA) to provide increased spectral efficiency.

CDMA systems, such as those conforming to the widely known IS-95 standard, achieve increased channel capacity by using "spread spectrum" techniques wherein a channel is defined by modulating a data-modulated carrier signal by a unique channelization or spreading code (sequence), i.e., a sequence that spreads an original data-modulated carrier over a wide portion of the frequency spectrum in which the communications system operates. Conventional spread-spectrum CDMA communications systems commonly use "direct sequence" (DS) spread spectrum modulation. In direct sequence modulation, a data-modulated carrier is directly modulated by a spreading code or sequence before being amplified by a power amplifier and transmitted over a communications medium, e.g., an air interface. FIG. 3 illustrates a conventional DS transmitting technique, wherein symbol streams $d_1(t), d_2(t), \ldots, d_K(t)$ are modulated according to respective spreading sequences (codes) $Q_1(t), Q_2(t), \ldots, Q_K(t)$, producing spread-spectrum signals $r_1(t), r_2(t), \ldots, r_3(t)$ that are summed to form a composite signal that is transmitted in a wireless communications medium.

CDMA systems currently in use typically use spreading codes selected from a set of orthogonal spreading codes. For example, according to IS-95, a base station serving a cell assigns forward link channelization codes to users from a set of 64 Walsh codes of length 64 chips. These codes are orthogonal when they are synchronous. Consequently, if there is little or no multipath in the propagation channel, the forward link channels from the same base station to all users in the cell generally remain orthogonal and users in the same cell cause little or no interference among one another.

Proposed CDMA systems may have to serve much larger numbers of users with much higher information rate demands than existing systems and, accordingly, may require many more channels (and channelization codes) than existing systems. For example, the proposed IS-2000 (cdma2000) standard is aimed at providing high data rate and multimedia applications. According to this standard, a user can simultaneously receive many data streams corresponding to many services such as voice, video, internet, fax, etc. To be able to provide all these data streams, the current proposed IS-2000 standard allows the cellular system to concurrently assign up to 3 codes, i.e., 3 channels, to the same user.

Different approaches have been proposed to provide sufficient code choices for such systems. One approach involves allowing the use of orthogonal codes in addition to the 64-bit Walsh codes used in current systems, for example, codes with lengths of 128, 256 and 512. This can significantly increase the number of available codes, even though the number of available codes may be constrained because simultaneous use of some codes of different lengths can destroy orthogonality.

A second approach involves the use of "quasi-orthogonal" codes, i.e., codes that exhibit low correlation between one another, but that are not completely orthogonal. A set of Walsh codes of length N includes N orthogonal codes. Letting $W_i$ denote the ith Walsh code within a Walsh code set of length N chips, the cross-correlation among different Walsh codes of length N is given by:

$$C_{i,j} = \int_0^T W_i t W_j t dt, \quad (1)$$

where T=N is the period of Walsh code and is the chip duration. The cross-correlation $_i$ for the Walsh code set meets the following constraint:

$$C_{i,j} = \begin{cases} T & i \\ 0 & i \end{cases}. \quad (2)$$

Hence, different Walsh codes have zero cross-correlation and are orthogonal.

Relaxing the cross-correlation constraint can increase the number of available codes. For example, a set of quasi-orthogonal codes consisting of 4 groups of N quasi-orthogonal codes can be formed, thus increasing the number of available codes to 4N codes. Denoting the ith codes in the nth group by $Q_i^n$, i=1, 2, 3, ... N and n=1, 2, 3 and 4, the quasi-orthogonal codes meet the following cross-correlation constraint:

$$|C_{i,j}^{n,m}| = \left| \int_0^T Q_i^n t \tilde{Q}_j^m t dt \right| = \begin{cases} T & i = j \text{ and } m \\ 0 & i \neq j \text{ and } m, \\ \leq xT_c & m \neq n \end{cases} \quad (3)$$

where x<<N. Equation (3) indicates that the N codes within a group of the four groups are orthogonal (i≠j and m=n), while codes from different groups (n≠m) have a low cross-correlation. Such a quasi-orthogonal coding scheme is described in TIA/EIA/IS-2000-2, Ballot Resolution Version (July, 1999).

As explained above, using quasi-orthogonal codes can increase the number of available codes, but codes from different groups are not orthogonal. Typically, a CDMA system utilizing such quasi-orthogonal codes would use all the codes in a first group and, once all of the codes of the first group are in use, start assigning codes from a second group. When a new code from the second group is used, the signal produced according to this code will generally exhibit interference arising from signals transmitted using the codes in the first group. However, the signals transmitted using the codes in the first group will generally exhibit a low level of interference as long as the number of codes in use from the second group is low. Under such conditions, channels that are assigned codes in the second group are disadvantaged in relation to channels defined by codes from the first group. To correct this imbalance, the system operator may select to make the number of activated codes from both groups equal. However, this can result in degradation of overall system performance. Accordingly, there is a need for techniques for transmitting coded signals which can improve system performance.

SUMMARY OF THE INVENTION

The present invention can meet this need by "precompensating" a transmitted signal based on knowledge of a signal that is to be concurrently transmitted therewith. According to embodiments of the present invention, compensation for interference in a second coded signal arising from a first, concurrently transmitted coded signal may be achieved by generating the second coded signal from an interference-compensated information symbol that is generated based on knowledge of the code and information symbol used to generate the first coded signal. For example, if the first and second coded signals are encoded according to respective codes selected from respective first and second orthogonal groups of a set of quasi-orthogonal codes, this compensation (or "pre-compensation') can reduce interference in the second coded signal arising from lack of orthogonality of the codes from the first and second groups of codes. The amount of compensation can be adjusted to achieve a desired estimated signal quality, e.g., estimated signal to interference ratio, based on a scaling factor that can be determined based on the relative numbers of codes from each group of codes that are in use. In this manner, for example, signal-to-interference characteristics at a receiving station attempting to receive the second coded signal may be improved.

In particular, according to one embodiment of the present invention, an interference-compensated information symbol is generated from a source information symbol based on knowledge of an information symbol and a code used to generate a first coded signal. The first coded signal is then concurrently transmitted with a second coded signal representing the interference-compensated information symbol encoded according to a second code.

According to one embodiment of the present invention, a first composite signal is generated from at least one information symbol according to at least one code from a first group of codes of a set of quasi-orthogonal codes. A first interference-compensated information symbol is then generated from a first information symbol, the first composite signal and a code from a second group of codes of the set of quasi-orthogonal codes. A second coded signal representing the first interference-compensated information symbol encoded according to the code from the second group of codes is then transmitted concurrently with transmission of the first coded signal. Preferably, the first interference-compensated information symbol is generated by integrating a product of the first composite signal and the complex conjugate of the code from the second group of codes over a symbol interval, scaling the integrated product by a scaling factor, and subtracting the scaled integrated product from the first information symbol to generate the first interference-compensated information symbol. According to an aspect of the present invention, respective first and second numbers of codes from the first group of codes and the second group of codes to be used to transmit information symbols for the symbol interval are determined, and the scaling factor is determined based on the determined first and second numbers using, for example, a signal quality criterion, such as an estimated signal to interference ratio (SIR) criterion.

According to another aspect of the present invention, mutual compensation is provided for signals generated according to codes from first and second groups of codes of a quasi-orthogonal set of codes. A second composite signal is generated from at least one information symbol according to at least one code from the second group of codes. A second interference-compensated information symbol is then generated from a second information symbol, the second composite signal and a code from the first group of codes. A first coded signal representing the second interference-compensated information symbol encoded according to the code from the first group of codes and a second coded signal representing the first interference-compensated information symbol encoded according to the code from the second group of codes are then concurrently transmitted.

According to another method aspect of the present invention, in a wireless communications system in which at least one base station is operative to transmit on respective channels defined by respective spreading codes selected from a set of quasi-orthogonal spreading codes, the set of quasi-orthogonal spreading codes including a first group of orthogonal spreading codes and a second group of orthogonal spreading codes, an interference-compensated information symbol is generated from a source information symbol based on knowledge of an information symbol and a code from the first group of codes used to generate a first coded signal. The first coded signal and a second coded signal representing the interference-compensated information symbol encoded according to a code from the second group of codes are concurrently transmitted.

According to yet another aspect of the present invention, a communications system includes at least one transmitter that generates an interference-compensated information symbol from a source information symbol based on knowledge of an information symbol and a code used to generate a first coded signal. Then at least one transmitter concurrently transmits the first coded signal and a second coded signal representing the interference-compensated information symbol encoded according to a second code. According to one embodiment of the present invention, the at least one transmitter may include a composite signal generating circuit that generates a composite signal from at least one first information symbol according to a corresponding at least one code from a first group of codes of a set of quasi-orthogonal codes. An interference-compensating coded signal generating circuit generates the interference-compensated information symbol from the source information symbol, the composite signal and a code from a second group of codes of the set of quasi-orthogonal codes, and generates the second coded signal from the interference-compensated information symbol according to the code from the second group of codes.

According to another aspect of the present invention, a wireless communications base station includes an interference-compensating transmitter operative to transmit on respective channels defined by respective spreading codes selected from a set of quasi-orthogonal spreading codes, the set of quasi-orthogonal spreading codes including a first group of orthogonal spreading codes and a second group of orthogonal spreading codes. The transmitter is further operative to generate an interference-compensated information symbol from a source information symbol based on knowledge of an information symbol and a code from the first group of codes used to generate a first coded signal and to concurrently transmit a second coded signal representing the interference-compensated information symbol encoded according to a code from the second group of codes. The transmitter may include a composite signal generating circuit that encodes at least one information symbol according to at least one code from the first group of codes to generate a composite signal, and an interference-compensating coded signal generating circuit that integrates a product of the composite signal and the complex conjugate of the code from the second group of codes over a symbol interval, scales the integrated product by a scaling factor, and subtracts the scaled integrated product from the source information symbol to generate the interference-compensated information symbol.

DETAILED DESCRIPTION OF THE INVENTION

Figure 1:
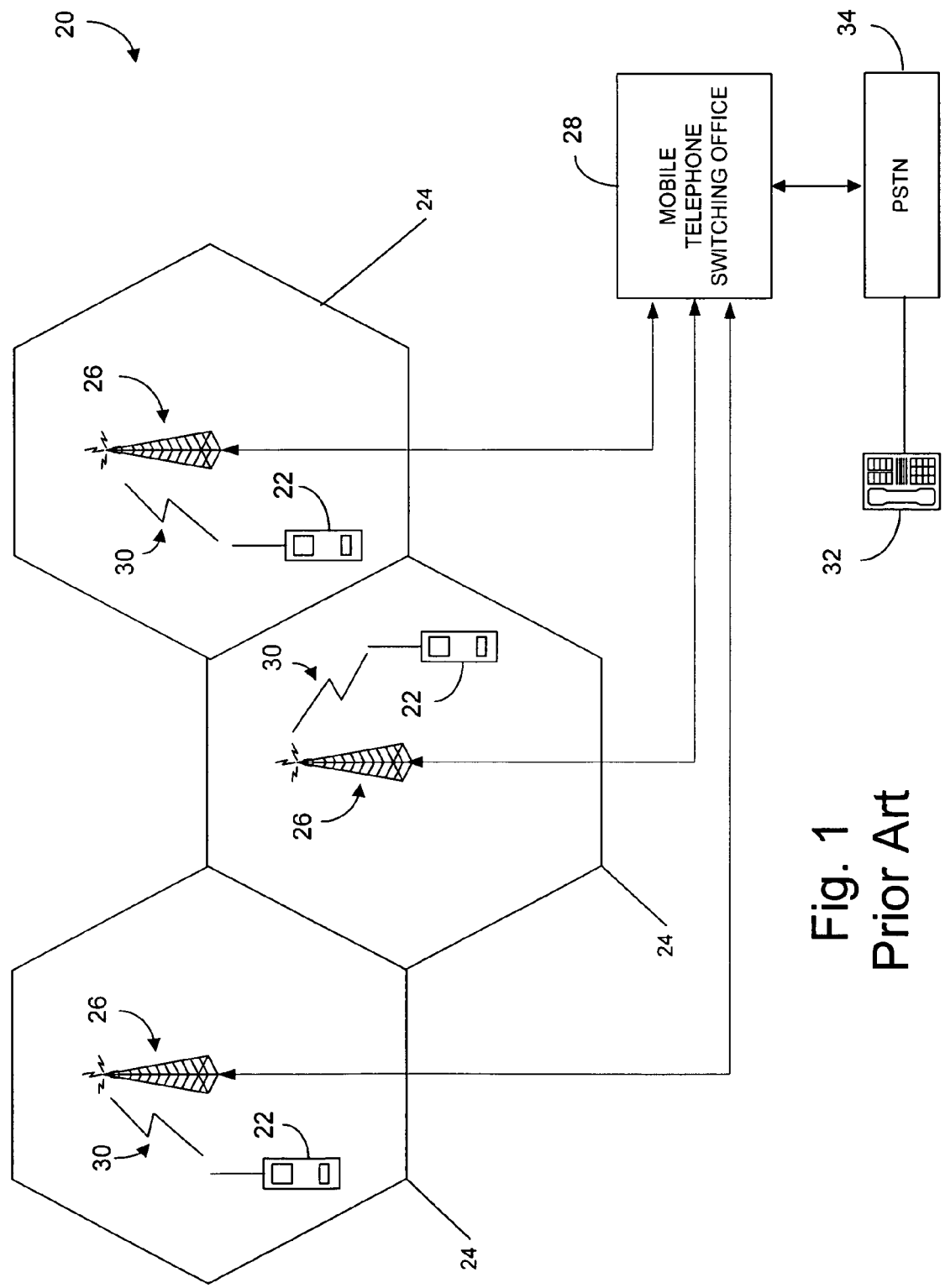
FIG. 1 is a schematic diagram illustrating a terrestrial wireless communications system according to the prior art.
Figure 2:
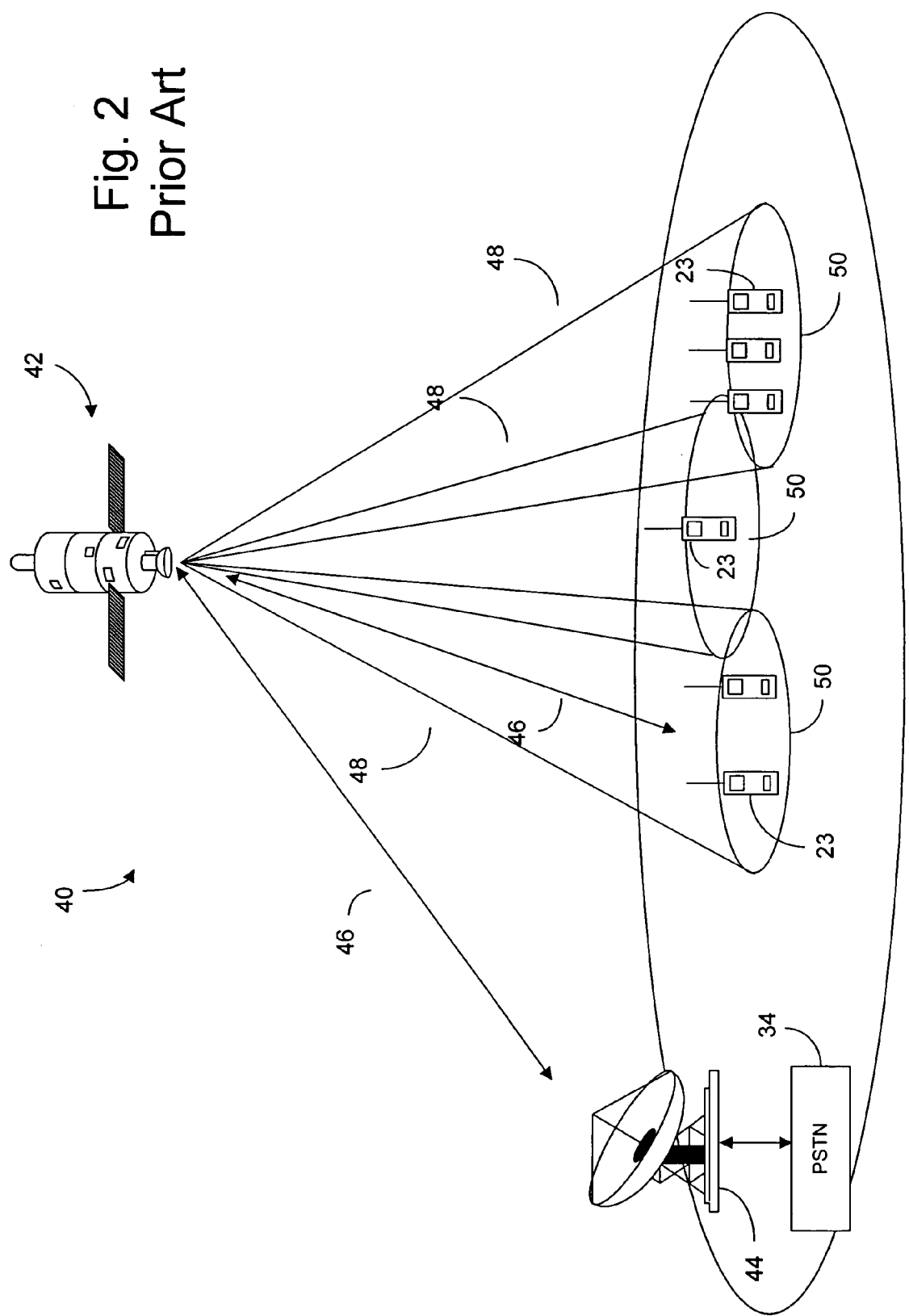
FIG. 2 is a schematic diagram illustrating a satellite wireless communications system according to the prior art.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. Although embodiments of the present invention described herein relate to spread spectrum code division multiple access (CDMA) wireless communications systems, in particular, to proposed IS-2000 (cdma2000) systems, it will be appreciated by those skilled in the art that the present invention is applicable to other wireless communications systems. It will also be appreciated that the present invention may also be used in other communications applications, including wireline and optical communications applications.

Figure 4:
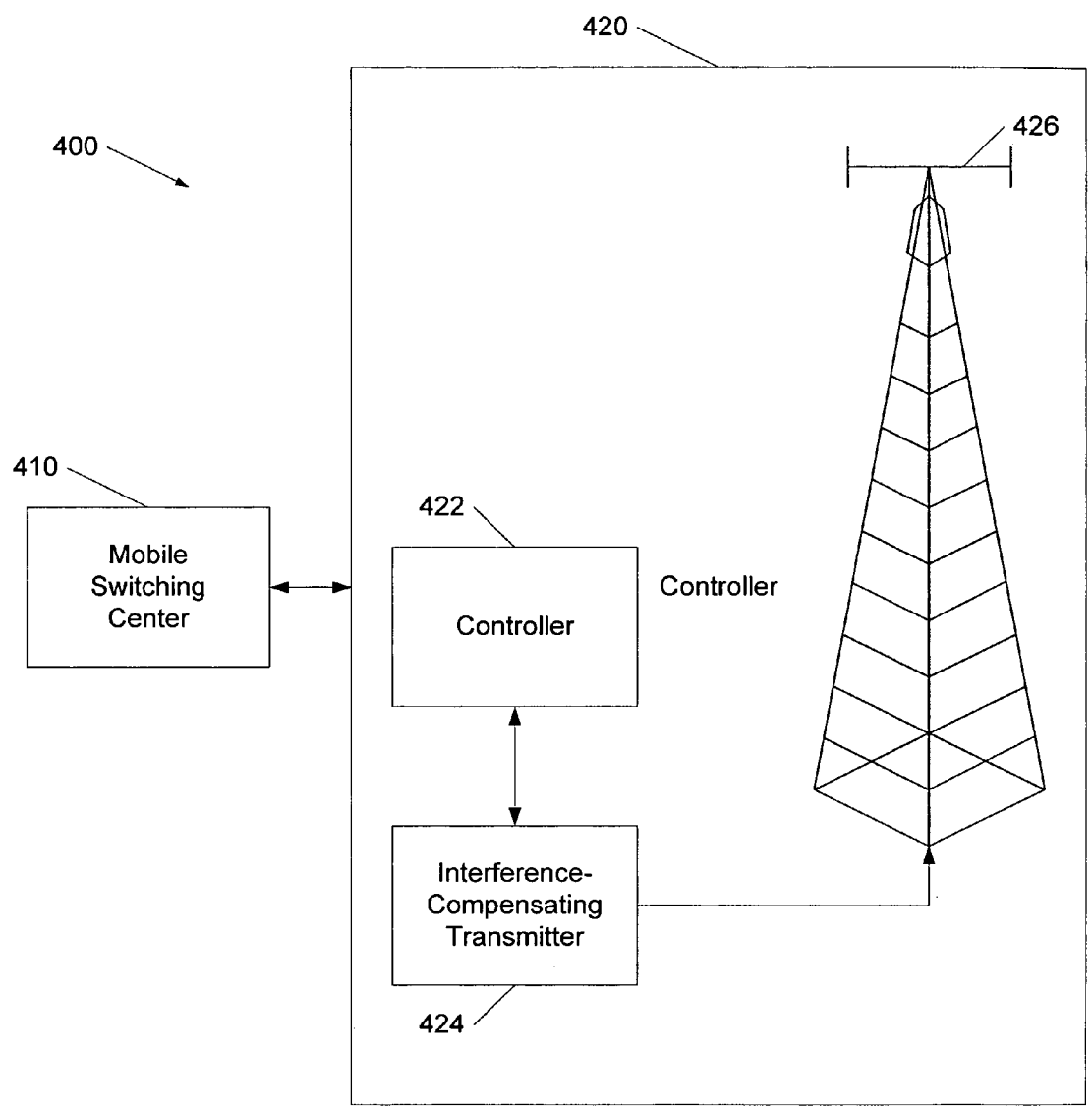
FIG. 4 is a schematic diagram illustrating exemplary components of a wireless communications system according to an embodiment of the present invention.

FIG. 4 illustrates components of a wireless communications system 400 according to an embodiment of the present invention. The wireless communications system includes a base station 420 and a mobile switching center (MSC) 410 that is operatively associated with the base station 420. It will be appreciated the base station 420 may comprise any of a number of different types of apparatus that perform base station functions but are referred to using different nomenclature, including, but not limited to, base transceiver stations (BTS), "cell sites", "radio heads" and the like.

The base station 420 includes a controller 422 that communicates with the MSC 410, and that may provide a number of different monitoring and/or control functions at the base station 420. The base station 420 also includes an interference-compensating transmitter 424 that is operatively associated with the controller and that transmits coded signals in a wireless communications medium via an antenna 426. The coded signals transmitted by the interference-compensating transmitter 424 may represent information received from the MSC 410, such as speech or other data for transmission to a terminal (e.g., a cellular telephone). The interference-compensating transmitter 424 may generate the coded signals using various techniques as described below.

Figure 3:
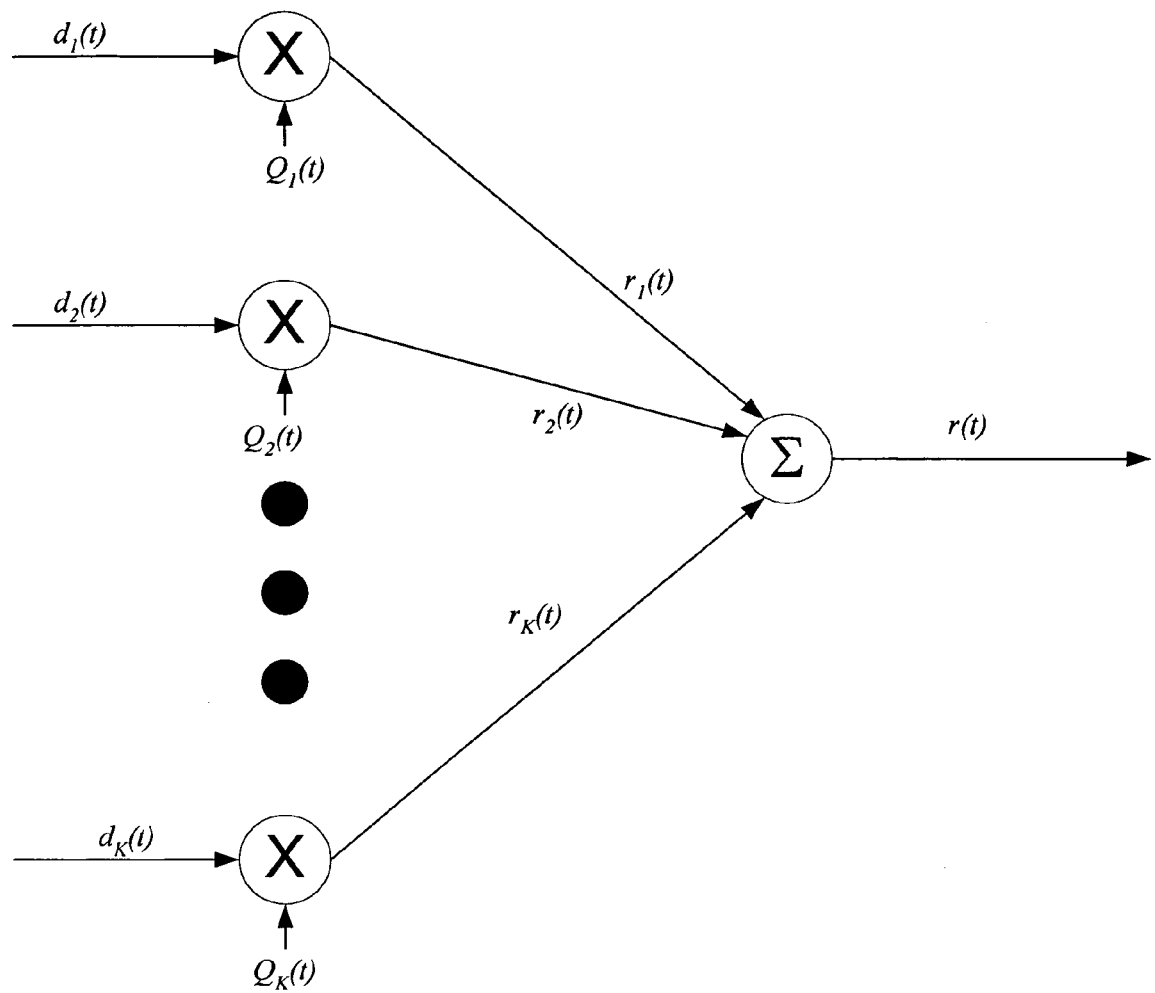
FIG. 3 is a schematic diagram illustrating a technique for generating spread spectrum signals according to the prior art.

A baseband model of a signal generated by a conventional transmission technique, such as that illustrated in FIG. 3, as received at a receiver, may be given by:

$$rt = \sum_{i=1}^{K_1} d_i^1 t Q_i^1 t + \sum_{j=1}^{K_2} d_j^2 t Q_j^2, \qquad (4)$$

where $d_l^g$ represents a complex symbol to be transmitted using the lth code in a gth group of a quasi-orthogonal code set, and the symbol duration is $T=NT_c$. In equation (4), multiplication with the pilot channel, fading and noise are ignored for purposes of illustration. The output of the receiver for the nth code of the second group is given by:

$$Z_n^2 = \int_0^T rt \tilde{Q}_n^2 t dt = d_n^2 T + \sum_{i=1}^{K_1} d_i^1 C_i^{1'}. \qquad (5)$$

The second term in the right hand side of equation (5) represents interference affecting the nth channel in the second group.

According to an aspect of the present invention, this interference term may be compensated for at the transmitter to reduce the interference in the signal received at the receiver. A first case will now be described in which it is desired to compensate for interference arising from codes of a first group of a quasi-orthogonal code set on a channel using the nth code in a second group of codes of the quasi-orthogonal code set.

Figure 5:
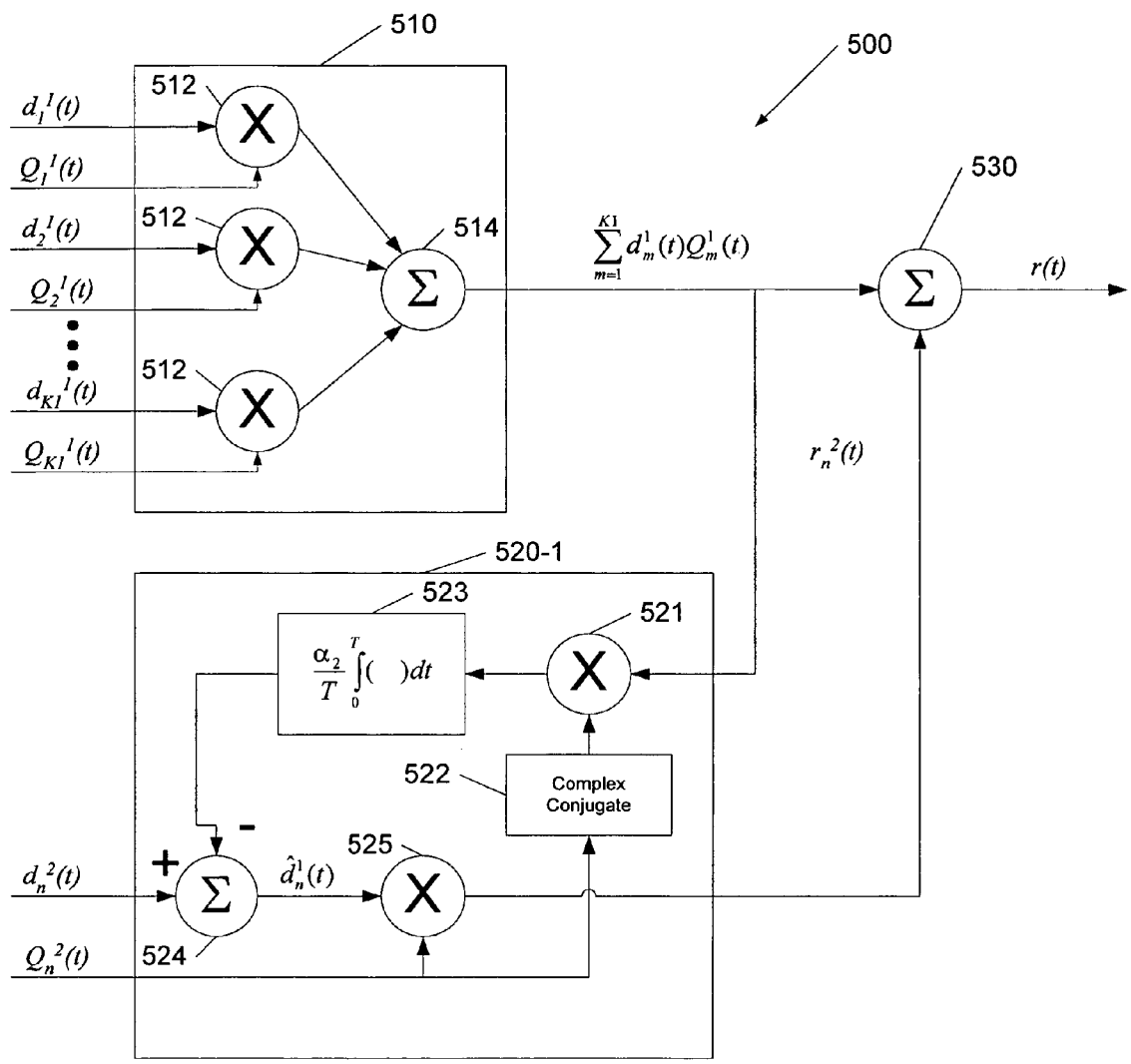
FIG. 5 is a schematic diagram illustrating an interference-compensating transmitter according to an embodiment of the present invention.

FIG. 5 illustrates an interference-compensating transmitter 500 according to this aspect of the present invention. A composite signal generating circuit 510 generates a composite signal $$\sum_{m=1}^{K_1} d_m^1 Q$$

from a set of $K_1$ first information symbols $d_1^1(t), d_2^1(t), \ldots, d_{K_1}^1($. Each of the first information symbols $d_1^1(t), d_2^1(t), \ldots, d_{K_1}^1($ is modulated by respective spreading codes $Q_1^1(t), Q_2^1(t), \ldots, Q_{K_1}^1($ from a first group of orthogonal spreading codes of a set of quasi-orthogonal spreading code using multiplier circuits 512. The resulting signals are then combined by a summing circuit 514 to produce the composite signal $$\sum_{m=1}^{K_1} d_m^1 Q.$$

The composite signal $$\sum_{m=1}^{K_1} d_m^1 Q$$

is applied to an interference-compensating coded signal generating circuit 520. The interference-compensating coded signal generator circuit 520 includes a multiplier circuit 521 that multiplies the composite signal $$\sum_{m=1}^{K_1} d_m^1 Q$$

by a complex conjugate of the nth spreading code $Q_n^2(t)$ of the second group produced by a complex conjugating circuit 522. A scaling integrating circuit 523 integrates the resulting signal over a symbol interval T, normalized by the symbol duration T and scaled by a scaling factor $\alpha_2$. The scaled and integrated product $V_n^1(t)$ of the composite signal $$\sum_{m=1}^{K_1} d_m^1 Q$$

and the spreading code $Q_n^2(t)$ is then subtracted from an information symbol $d_n^2(t)$ in a subtraction circuit 524 to produce an interference-compensated information symbol $\tilde{d}_n^2(t)$, which is then multiplied by the spreading code $Q_n^2(t)$ in a multiplier circuit 525 to produce a coded signal $r_n^2(t)$. The coded signal $r_n^2(t)$ is then combined with the composite signal $$\sum_{m=1}^{K_1} d_m^1 Q$$

in a summing circuit 530 to produce a combined signal r(t) for transmission in the wireless communications medium.

The scaled and integrated product $V_n^1(t)$ may be given by:

$$V_n^1 = \frac{\alpha_2}{T} \int_0^T \left[ \sum_{m=1}^{K_1} d_m^1 t Q_m^1 t \right] \tilde{Q}_n^2 t dt \qquad (6)$$

-continued $$= \frac{\alpha_2}{T} \sum_{m=1}^{K_1} d_m^1 C_{m,n}^{1,2},$$

where $\alpha_2$ is a positive constant $\leq 1$. Over the symbol duration T, $V_n^1(t)$ is constant. Accordingly, the transmitted combined signal r(t) may be given by:

$$rt = \sum_{i=1}^{K_1} d_i^1 t Q_i^1 t + \sum_{j=1}^{K_2} [d_j^2 t - V_j^1] Q_j^2, \quad (7)$$

The first term in the right hand side of equation (7) is the composite signal $$\sum_{m=1}^{K_1} d_m^1 Q,$$

while the second term in the right hand side of equation (7) represents the interference-compensated signal for the signal generated according to the nth code from the second group. The output of a receiver attempting to receive the signal encoded according to the nth code (assuming no fading or other interference) may be given by:

$$Z_n^2 = \int_0^T rt \tilde{Q}_n^2 t dt = d_n^2 - V_n^1 T + \sum_{i=1}^{K_1} d_i^1 C_i^1, \quad (8)$$

$$d_n^2 T + 1 - \alpha_2 \sum_{i=1}^{K_2} d_i^1 C_{i,n}^{1,2}.$$

In equation (8), the term $d_n^2 T$ represents the desired signal, while the term $$(1 - \alpha_2) \sum_{i=1}^{K_1} d_i^1 C_{j/i,n}^{1,n}$$

represents interference arising from the codes of the first group. Comparing equation (8) with equation (5), the interference from the codes from the first group is canceled to an extent determined by the scaling factor $\alpha_2$, for example, if $\alpha_2=1$ the interference theoretically is completely canceled. From equation (8) (ignoring channel Gaussian noise and fading), the received signal to interference ratio (SIR) for the channel encoded according to the nth code from the second group may be given by:

$$SIR_2 = \frac{N^2}{K_1 x^2 1 - \alpha_2}. \quad (9)$$

Looking at the interference on channels encoded according to codes from the first group, the output of a receiver receiving a channel encoded according to the nth code $Q_n^1(t)$ from the first group may be given by:

$$Z_n^1 = \int_0^T rt \tilde{Q}_n^1 t dt = d_n^1 T + \sum_{j=1}^{K_2} d_j^2 - V_j^1 C_j^2. \quad (10)$$

Equation (10) may be manipulated to yield:

$$Z_n^1 = d_n^1 T_c N - \alpha_2 K_2 x^2 / N + \sum_{j=1}^{K_2} d_j^2 C_{j,n}^{2,1} - \frac{\alpha_2}{T} \sum_{j=1}^{K_2} C_{j,n}^{2,1} \sum_{m=1 \neq n}^{K_1} d_m^1 C_m^1. \quad (11)$$

The first term on the right hand side of equation (11) corresponds to the desired signal, while the second term is similar to the interference term in equation (7) and represents interference that would arise from signal encoded according to codes in the second group if these signals were not compensated. The third term in equation (11) is an additional interference term arising from the use of compensation in signals transmitted according to codes from the second group.

The value of $\alpha_2$ preferably is selected to produce desired signal to interference characteristics for the signals. The SIR of a channel encoded according to a code from the first group may be estimated by:

$$SIR_1 = \frac{N - \alpha_2 K_2 x^2 / N^2}{x^2 K_2 + x^4 \alpha_2^2 K_2 K_1 - 1/}. \quad (12)$$

One criteria for selecting the scaling factor $\alpha$ is to equalize estimated SIR for all active channels. Generally, the degree of improvement in estimated SIR over an uncompensated transmitter increases as the difference between the number $K_1$ of active channels using codes from the first set and the number $K_2$ of active channels using codes from the second group increases.

Figure 6:
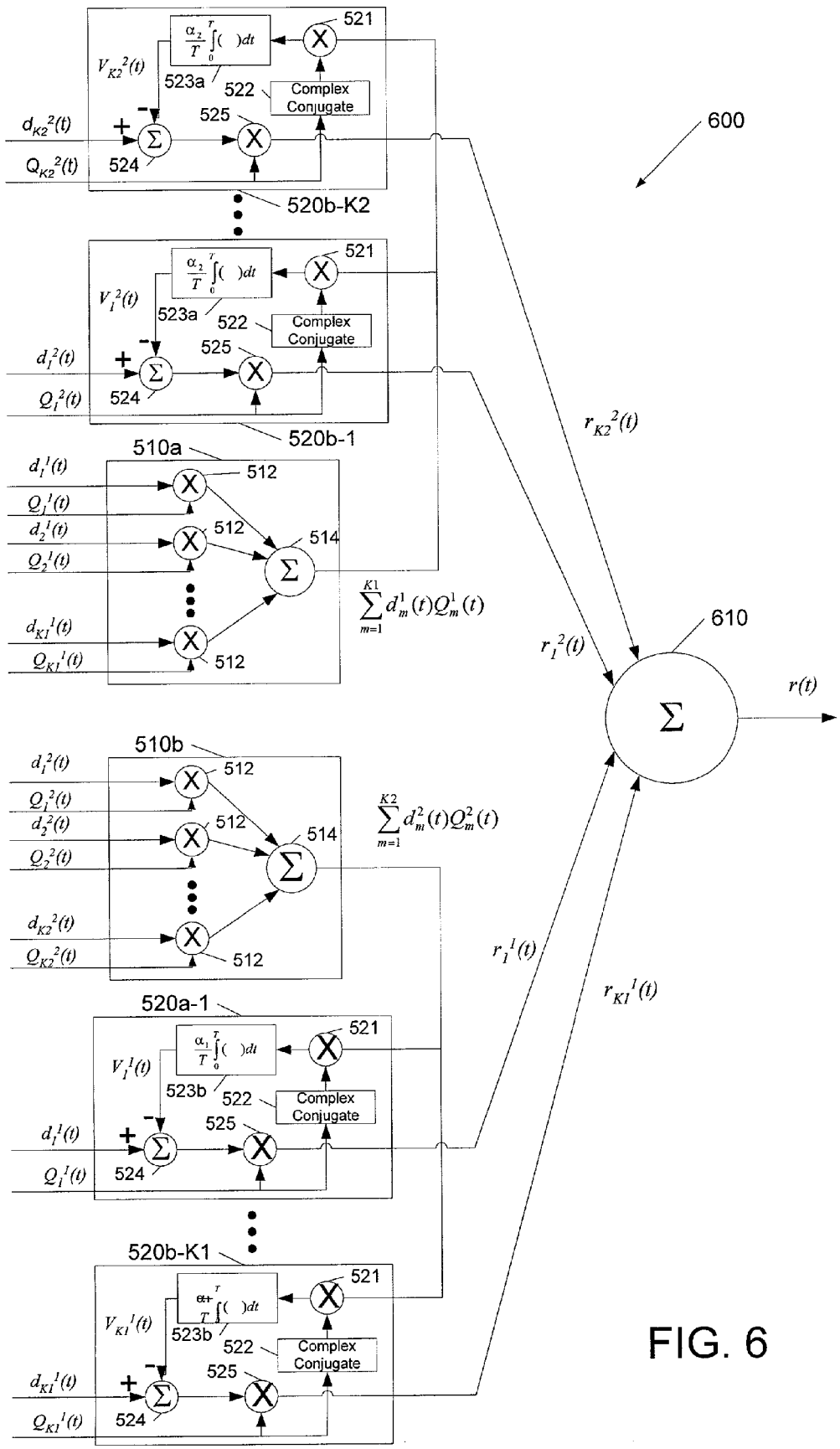
FIG. 6 is a schematic diagram illustrating an interference-compensating transmitter according to another embodiment of the present invention.

According to another aspect of the present invention, mutual interference in signals generated from both groups of codes can be compensated. FIG. 6 illustrates an interference-compensating transmitter 600 according to this aspect of the present invention. The interference-compensating transmitter 600 includes a first composite signal generating circuit 510*a* that generates a first composite signal $$\sum_{m=1}^{K_1} d_m^1 Q$$

from first information symbols $d_1^1(t), d_2^1(t), \ldots, d_{K1}^1(t)$ and corresponding spreading codes $Q_1^1(t), Q_2^1(t), \ldots, Q_{K1}^1(t)$ from a first orthogonal group of the quasi-orthogonal code set. A second composite signal generating circuit 510*b* generates a second composite signal $$\sum_{m=1}^{K_2} d_m^2 Q$$

from second information symbols $d_1^2(t), d_2^2(t), \ldots, d_{K2}^2(t)$ and corresponding spreading codes $Q_1^2(t), Q_2^2(t), \ldots, Q_{K2}^2(t)$ from a second orthogonal group of the quasi-orthogonal code set. Each of the first and second composite signal generating circuits 510a, 510b includes multiplier circuits 512 and a summing circuit 514, which function as described with reference to FIG. 5.

The first and second composite signals $$\sum_{m=1}^{K_1} d_m^1 Q, \sum_{m=1}^{K_2} d_m^2 Q$$

produced by the first and second composite signal generating circuits 510a, 510b are applied to respective first and second sets of interference-compensating coded signal generating circuits 520a-1, ..., 520a-K2, 520b-1, ..., 520b-K1 to produce interference-compensated coded signals $r_1^1(t), \ldots r_{K1}^1(t), r_1^2(t), \ldots, r_{K2}^2(t)$ that are combined by a summing circuit 610 to produce a combined signal r(t) for transmission in the wireless communications medium. Each of the first and second interference-compensating coded signal generating circuits 520a-1, ..., 520a-K2, and 520b-1, ..., 520b-K1 include multiplier circuits 521, 525 and summing circuits 524 that function as described with reference to FIG. 5. The first interference-compensating coded signal generating circuits 520a-1, ..., 520a-K1 that produce coded signals $r_1^1(t), \ldots r_{K1}^1(t)$ from the codes for the first group of codes each include a scaling integrating circuit 523a that employs a first scaling factor $\alpha_1$. The second interference-compensating coded signal generating circuits 520b-1, ..., 520b-K2 that produce coded signals $r_1^2(t), \ldots r_{K1}^2(t)$ from the codes for the second group of codes each include a scaling integrating circuit 523b that employs a second scaling factor $\alpha_2$.

The combined signal r(t) in this case is given by:

$$rt = \sum_{i=1}^{K_1} [d_i^1 t - V_i^2] Q_i^1 t + \sum_{j=1}^{K_2} [d_j^2 t - V_j^1] Q_j^2. \quad (13)$$

Respective SIRs $SIR_1, SIR_2$ for channels coded according to the respective first and second groups of codes may be given by:

$$SIR_1 = \frac{N - \alpha_2 K_2 x^2/N^2}{1 - \alpha_1^2 x^2 K_2 + x^4 \alpha_2^2 K_2 K_1 - 1/}, \text{ and} \quad (14)$$

$$SIR_2 = \frac{N - \alpha_1 K_1 x^2/N^2}{1 - \alpha_2^2 x^2 K_1 + x^4 \alpha_1^2 K_1 K_2 - 1/}. \quad (15)$$

When $\alpha_1$ and $\alpha_2$ are chosen to equalize estimated SIR among the signals, improvement in SIR generally increases as the difference between $K_1$ and $K_2$ increases.

Figure 7:
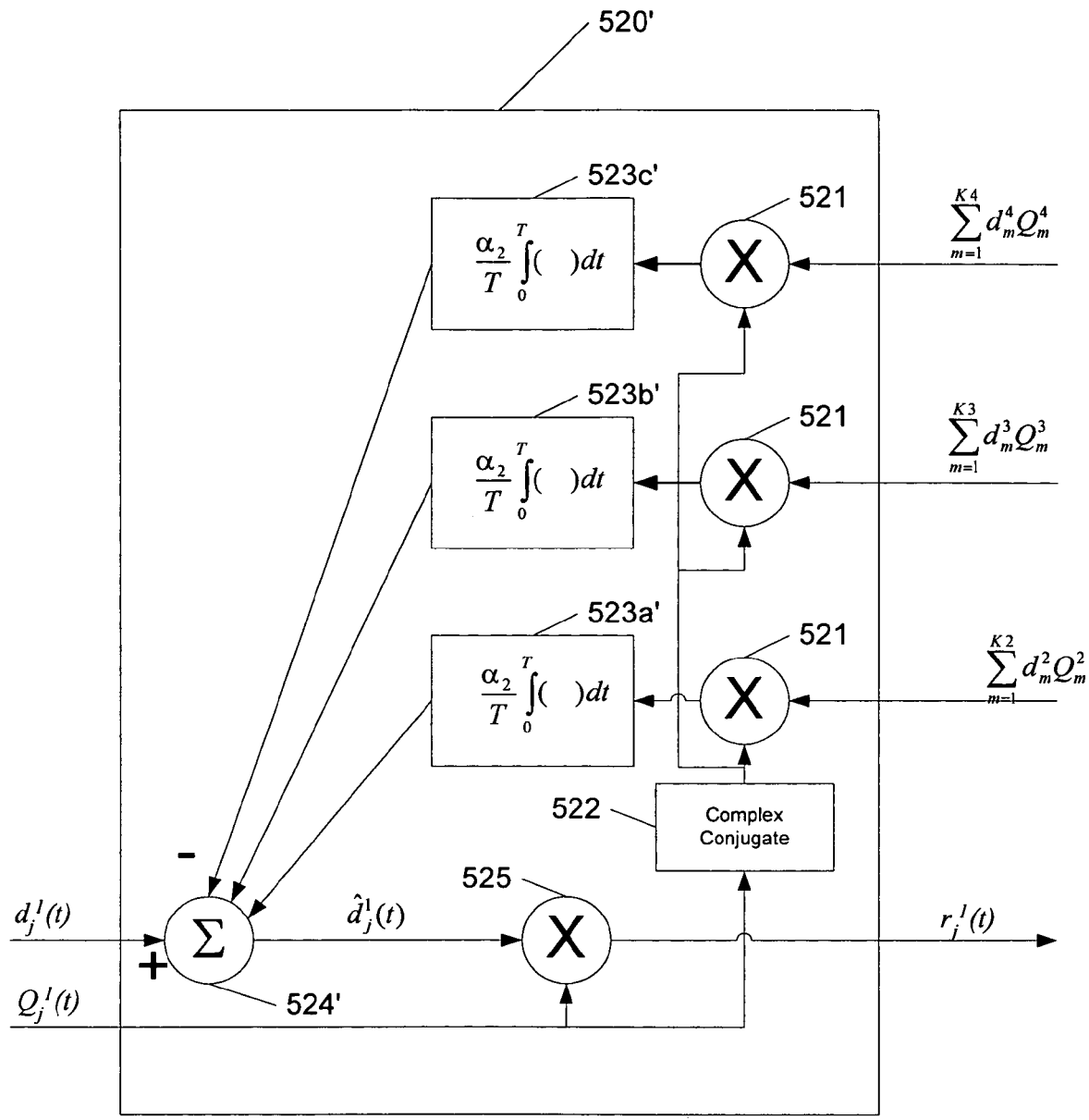
FIG. 7 is a schematic diagram illustrating an interference-compensating circuit according to another embodiment of the present invention.

The present invention is also applicable when more than two groups of codes are used. An exemplary interference-compensating coded signal generating circuit 520' for a channel encoded according to a jth code $Q_j^1(t)$ of a first group of codes using such an application is illustrated in FIG. 7. Composite signals $$\sum_{m=1}^{K_2} d_m^2 Q_m^2, \sum_{m=1}^{K_3} d_m^3 Q_m^3, \sum_{m=1}^{K_4} d_m^4 Q$$

for respective second, third and fourth groups of codes are each multiplied by the complex conjugate of the jth code $Q_j^1(t)$, and then integrated over a symbol period T and scaled by a scaling factor $\alpha_1$ by respective scaling integrating circuits 532a', 532b', 523c'. The scaled and integrated signals produced are then subtracted from the information symbol $d_j^1(t)$ at a subtraction circuit 524' to produce an interference-compensated information symbol $\hat{d}_j^1(t)$. The interference-compensated information symbol $\hat{d}_j^1(t)$ is then multiplied by the jth code $Q_j^1(t)$ to produce a coded signal $r_j^1(t)$, which can be combined with other coded signals and transmitted as described with reference to FIGS. 5–7.

Figure 8:
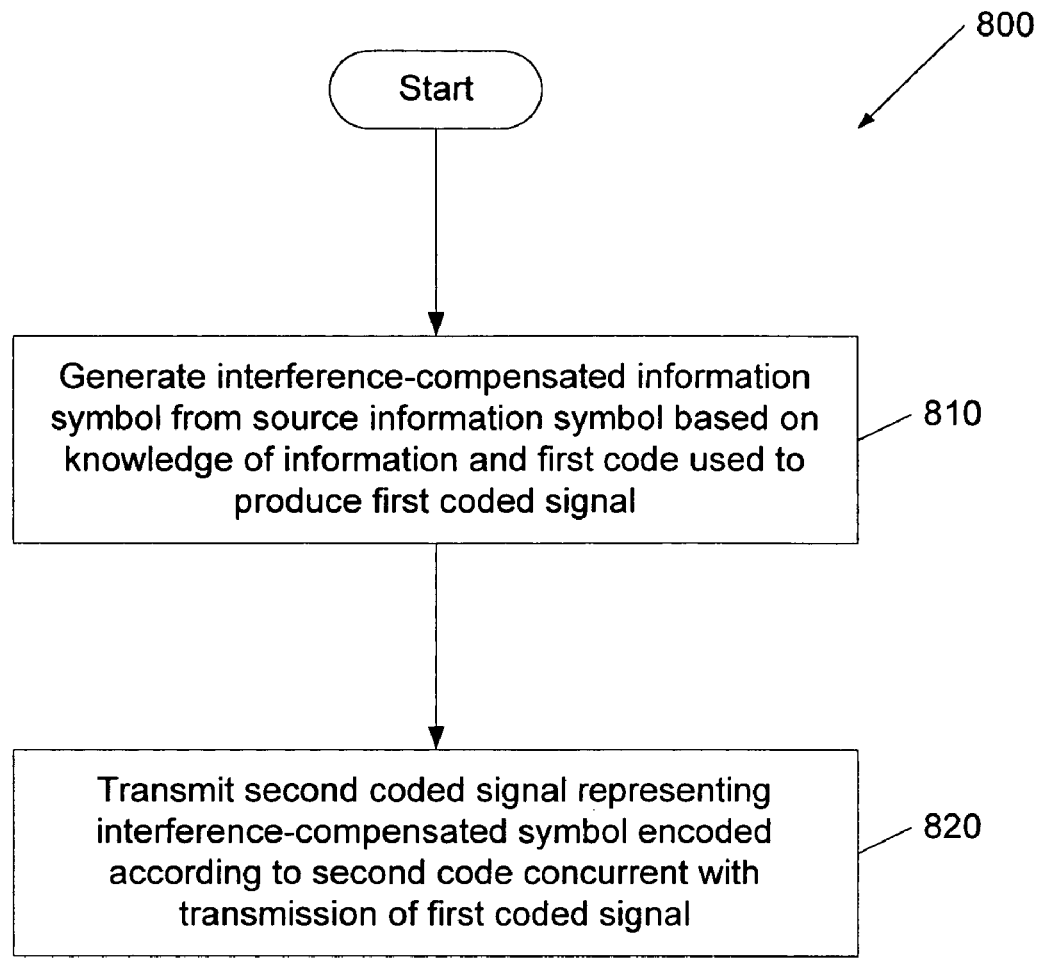
FIGS. 8–10 are flowcharts illustrating exemplary interference compensation operations according to embodiments of the present invention.
Figure 9:
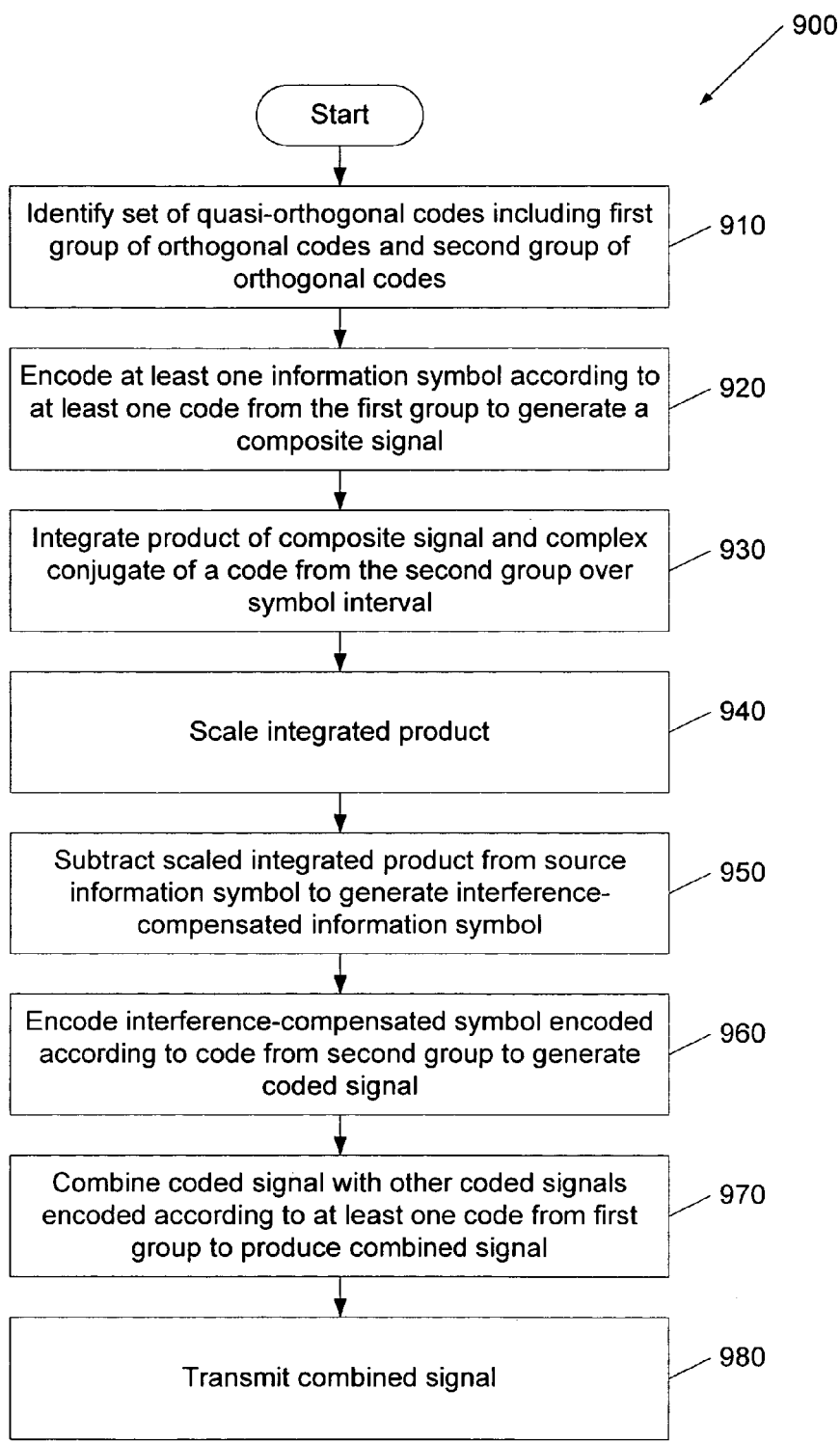
Figure 10:
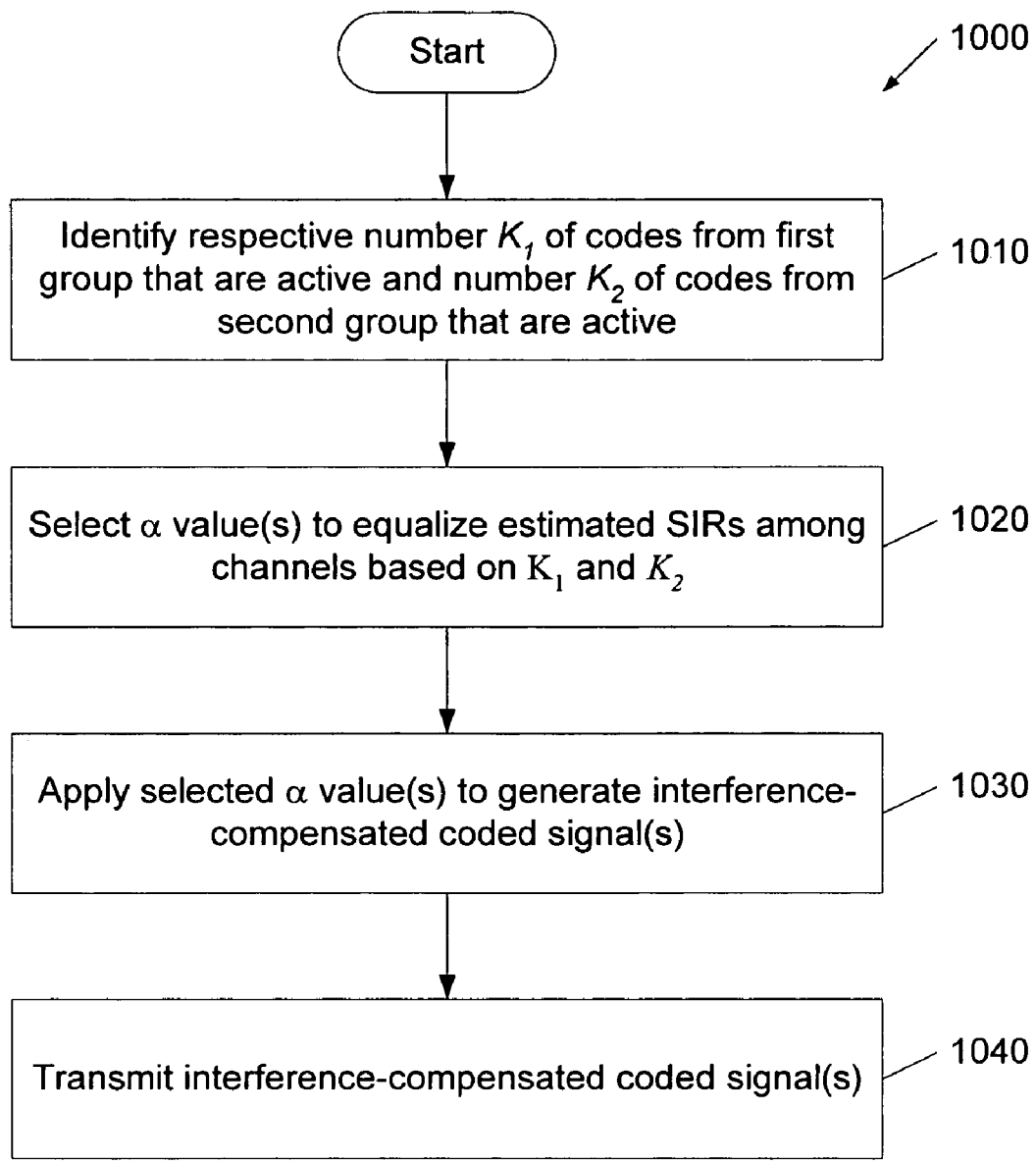

FIGS. 8–10 are flowcharts illustrating exemplary operations for decoding variably encoded signals according to aspects of the present invention. It will be understood that blocks of the flowcharts of FIGS. 8–10, and combinations of blocks in the flowchart illustrations, may be implemented using electronic circuits included in a transmitting station, such as the transmitter components illustrated in FIGS. 4–7. It will also be appreciated that blocks of the flowchart illustrations of FIGS. 8–10, and combinations of blocks in the flowchart illustrations, may be implemented using components other than those illustrated in FIGS. 4–7, and that, in general, the blocks of the flowchart illustrations of FIGS. 8–10, and combinations of blocks in the flowcharts, may be implemented in special purpose hardware such as discrete analog and/or digital circuitry, combinations of integrated circuits or one or more application specific integrated circuits (ASICs), as well as by computer program instructions which may be loaded onto a computer or other programmable data processing apparatus to produce a machine such that the instructions which execute on the computer or other programmable data processing apparatus implement the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Accordingly, blocks of the flowchart illustrations of FIGS. 8–10 support electronic circuits and other means for performing the specified functions, as well as combinations of steps for performing the specified functions. It will be understood that the circuits and other means supported by each block of the flowcharts of FIGS. 8–10, and combinations of blocks therein, can be implemented by special purpose hardware, software or firmware operating on special or general purpose data processors, or combinations thereof.

FIG. 8 illustrates exemplary interference-compensated signal transmission operations 800 according to an embodiment of the present invention. An interference-compensated information symbol is generated from an information symbol based on knowledge of an information symbol and a first code used to produce a first coded signal (Block 810). A second coded signal representing the interference-compensated information symbol encoded according to a second code is transmitted concurrently with transmission of the first coded signal (Block 820). It will be appreciated that the operations 800 can be implemented in a number of different ways, including the ways described with reference to FIGS. 5–7.

In exemplary operations 900 according to an embodiment of the present invention illustrated in FIG. 9, a set of quasi-orthogonal codes including first and second orthogonal groups is identified (Block 910). At least one information symbol is encoded according to at least one code from the first group to generate a composite signal (Block 920). A product of the composite signal and the complex conjugate of one of the codes of the second group is integrated over a symbol period (Block 930), and the resulting integrated product scaled according to a scaling factor (Block 940). The scaled integrated product is then subtracted from a source information symbol to generate an interference-compensated information symbol (Block 950). The interference-compensated information symbol is then encoded (e.g., multiplied) according to the code from the second group to generate a coded signal (Block 960). The coded signal is then combined with other coded signals, e.g., other coded signals generated in a similar fashion or the composite signal itself, to generate a combined signal (Block 970) that is transmitted in the communications medium (Block 980).

FIG. 10 illustrates exemplary operations 1000 according to yet another aspect of the present invention. Respective numbers $K_1$, $K_2$ of channelization codes actively in use from first and second groups of a quasi-orthogonal code set are identified (Block 1010). One or more values for one or more scaling factors $\alpha$ are determined such that estimated SIRs for the channels coded according to the active codes are equalized based on the numbers $K_1$, $K_2$ using, for example, the relations given in equations (14) and (15) (Block 1020). The selected values are then applied to generate one or more interference-compensated coded signals (Block 1030). The one or more interference-compensated coded signals are then transmitted (Block 1040).

It will be appreciated by those skilled in the art that the operations illustrated in FIGS. 5–10 may be varied within the scope of the present invention. For example, it may be desirable to select scaling factors to provide estimated SIR for some channels (e.g., channels that are more vulnerable to transmission errors) that is greater than that applied in other channels, instead of equalizing SIR among all channels. Criteria other than SIR may also be used to determine appropriate scaling factors. In other variations, instead of determining scaling factors for each symbol period, a transmitter may simply toggle between interference-compensated and non-interference-compensated modes of operation based on a threshold evaluation of the relative number of codes from different groups that are actively in use.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of transmitting comprising:
generating an interference-compensated information symbol from a source information symbol based on knowledge of an information symbol and a first code used to generate a first coded signal; and
concurrently transmitting the first coded signal and a second coded signal representing the interference-compensated information symbol encoded according to a second code.

2. The method according to claim 1:
wherein generating an interference-compensated information symbol from a source information symbol based on knowledge of an information symbol and a first code used to generate a first coded signal is preceded by generating a first composite signal from at least one information symbol according to at least one code from a first group of codes of a set of quasi-orthogonal codes;
wherein generating an interference-compensated information symbol from a source information symbol based on knowledge of an information symbol and a first code used to generate a first coded signal comprises generating a first interference-compensated information symbol from a first information symbol, the first composite signal and a code from a second group of codes of the set of quasi-orthogonal codes; and
wherein the second coded signal represents the first interference-compensated information symbol encoded according to the code from the second group of codes.

3. The method according to claim 2, wherein generating a first interference-compensated information symbol from a first information symbol, the first composite signal and a code from a second group of codes of the set of quasi-orthogonal codes comprises:
integrating a product of the first composite signal and a complex conjugate of the code from the second group of codes over a symbol interval;
scaling the integrated product by a scaling factor; and
subtracting the scaled integrated product from the first information symbol to generate the first interference-compensated information symbol.

4. The method according to claim 3, wherein scaling the integrated product by a scaling factor is preceded by:
determining respective first and second numbers of codes from the first group of codes and codes from the second group of codes to be used to transmit information symbols for the symbol interval; and
determining the scaling factor based on the determined first and second numbers.

5. The method according to claim 4, wherein determining the scaling factor based on the determined first and second numbers comprises determining the scaling factor from the determined first and second numbers using a signal quality criterion.

6. The method according to claim 5, wherein determining the scaling factor from the determined first and second numbers using a signal quality criterion comprises selecting the scaling factor such that it produces substantially equal estimated signal to interference ratios for signals coded according to the first and second codes.

7. The method according to claim 2:
wherein the first coded signal is the first composite signal;
wherein concurrently transmitting the first coded signal and a second coded signal representing the interference-compensated information symbol encoded according to a second code is preceded by:
encoding the first interference-compensated symbol according to the code from the second group of codes to produce the second coded signal; and
combining the first composite signal and the second coded signal to produce a combined signal; and wherein concurrently transmitting the first coded signal and a second coded signal representing the interference-compensated information symbol encoded according to a second code comprises transmitting the combined signal.

8. The method according to claim 2:
wherein concurrently transmitting the first coded signal and a second coded signal representing the interference-compensated information symbol encoded according to a second code is preceded by:
identifying at least one information symbol to be transmitted using at least one code from the second group of codes;
generating a second composite signal from the at least one information symbol to be transmitted using the at least one code from the second group of codes according to the at least one code from the second group of codes; and
generating a second interference-compensated information symbol from a second information symbol, the second composite signal and a code from the first group of codes; and
wherein the first coded signal represents the second interference-compensated information symbol encoded according to the code from the first group of codes.

9. The method according to claim 8:
wherein concurrently transmitting the first coded signal and a second coded signal representing the interference-compensated information symbol encoded according to a second code is preceded by:
encoding the second interference-compensated information symbol according to the code from the first group of codes to produce the first coded signal; and
combining the first and second coded signals to produce a combined signal; and
wherein concurrently transmitting the first coded signal and a second coded signal representing the interference-compensated information symbol encoded according to a second code comprises transmitting the combined signal.

10. The method according to claim 8, wherein generating a second interference-compensated information symbol from a second information symbol comprises:
integrating a product of the second composite signal and a complex conjugate of the code from the first group of codes over a symbol interval;
scaling the integrated product by a scaling factor; and
subtracting the scaled integrated product from the second information symbol to generate the second interference-compensated information symbol.

11. The method according to claim 10, wherein scaling the integrated product by a scaling factor is preceded by:
determining respective first and second numbers of codes from the first group of codes and codes from the second group of codes to be used to transmit information symbols for the symbol interval; and
determining the scaling factor based on the determined first and second numbers.

12. The method according to claim 11, wherein determining the scaling factor based on the determined first and second numbers comprises determining the scaling factor from the first and second numbers based on a signal quality criterion.

13. The method according to claim 12, wherein determining the scaling factor based on the determined first and second numbers comprises selecting the scaling factor such that it produces substantially equal estimated signal to interference ratios for signals modulated according to the first and second codes.

14. The method according to claim 1, wherein concurrently transmitting the first coded signal and a second coded signal representing the interference-compensated information symbol encoded according to a second code comprises concurrently transmitting the first coded signal and the second coded signal in a wireless communications medium from at least one wireless base station.

15. The method according to claim 2, wherein the codes of the first group of codes are orthogonal to one another, and wherein the codes of the second group of codes are orthogonal to one another.

16. The method according to claim 2 wherein the set of quasi-orthogonal codes comprises a set of quasi-orthogonal spreading codes.

17. In a wireless communications system in which at least one base station is operative to transmit on respective channels defined by respective spreading codes selected from a set of quasi-orthogonal spreading codes, the set of quasi-orthogonal spreading codes including a first group of orthogonal spreading codes and a second group of orthogonal spreading codes, a method of transmitting comprising:
generating an interference-compensated information symbol from a source information symbol based on knowledge of an information symbol and a code from the first group of codes used to generate a first coded signal; and
concurrently transmitting the first coded signal and a second coded signal representing the interference-compensated information symbol encoded according to a code from the second group of codes.

18. The method according to claim 17, wherein generating an interference-compensated information symbol from a source information symbol based on knowledge of an information symbol and a code from the first group of codes used to generate a first coded signal comprises:
encoding at least one information symbol according to at least one code from the first group of codes to generate a composite signal;
integrating a product of the composite signal and a complex conjugate of the code from the second group of codes over a symbol interval;
scaling the integrated product by a scaling factor; and
subtracting the scaled integrated product from the source information symbol to generate the interference-compensated information symbol.

19. The method according to claim 18, wherein scaling the integrated product by a scaling factor is preceded by:
determining a first number of codes from the first group of codes and second number of codes from the second group of codes to be used to transmit information symbols for the symbol interval; and
determining the scaling factor based on the determined first and second numbers.

20. The method according to claim 17, wherein concurrently transmitting the first coded signal and a second coded signal representing the interference-compensated information symbol encoded according to a code from the second group of codes comprises concurrently transmitting the first and second coded signals from the same base station.

21. A communications system, comprising:
at least one transmitter that generates an interference-compensated information symbol from a source information symbol based on knowledge of an information symbol and a first code used to generate a first coded signal and that concurrently transmits the first coded signal and a second coded signal representing the interference-compensated information symbol encoded according to a second code.

22. The system according to claim 21, wherein said at least one transmitter comprises:
a composite signal generating circuit that generates a composite signal from at least one information symbol according to at least one code from a first group of codes of a set of quasi-orthogonal codes; and
an interference-compensating coded signal generating circuit that generates the interference-compensated information symbol from the source information symbol, the composite signal and a code from a second group of codes of the set of quasi-orthogonal codes, and that generates the second coded signal from the interference-compensated information symbol according to the code from the second group of codes.

23. The system according to claim 22, wherein said interference-compensating coded signal generating circuit integrates a product of the composite signal and a complex conjugate of the code from the second group of codes over a symbol interval, scales the integrated product by a scaling factor, and subtracts the scaled integrated product from the source information symbol to generate the interference-compensated information symbol.

24. The system according to claim 23, wherein said interference-compensating coded signal generating circuit determines respective first and second numbers of codes from the first group of codes and codes from the second group of codes to be used to transmit information symbols for the symbol interval and determines the scaling factor based on the determined first and second numbers.

25. The system according to claim 21, wherein said at least one transmitter comprises at least one wireless transmitter positioned at a wireless base station.

26. The system according to claim 25, wherein said at least one wireless base station comprises a single wireless base station that concurrently transmits the first and second coded signals.

27. The system according to claim 22, wherein the codes of the first group of codes are orthogonal to one another, and wherein the codes of the second group of codes are orthogonal to one another.

28. The system according to claim 22 wherein the set of quasi-orthogonal codes comprises a set of quasi-orthogonal spreading codes.

29. A transmitting station, comprising:
means for generating an interference-compensated information symbol from a source information symbol based on knowledge of an information symbol and a first code used to generate a first coded signal; and
means for concurrently transmitting the first coded signal and a second coded signal representing the interference-compensated information symbol encoded according to a second code.

30. The transmitting station according to claim 29, further comprising:
means for generating a composite signal from at least one information symbol according to at least one code from a first group of codes of a set of quasi-orthogonal codes;
wherein said means for generating an interference-compensated information symbol from a source information symbol comprises means for generating an interference-compensated information symbol from the source information symbol, the composite signal and a code from a second group of codes of the set of quasi-orthogonal codes; and
wherein said means for concurrently transmitting comprises means for transmitting a second coded signal representing the first interference-compensated information symbol encoded according to the code from the second group of codes.

31. The transmitting station according to claim 30, wherein said means for generating the interference-compensated information symbol comprises:
means for integrating a product of the composite signal and a complex conjugate of the code from the second group of codes over a symbol interval;
means for scaling the integrated product by a scaling factor; and
means for subtracting the scaled integrated product from the source information symbol to generate the interference-compensated information symbol.

32. The transmitting station according to claim 31, further comprising:
means for determining respective first and second numbers of codes from the first group of codes and codes from the second group of codes to be used to transmit information symbols from the transmitting station for the symbol interval; and
means for determining the scaling factor based on the determined first and second numbers.

33. A wireless communications base station, comprising:
an interference-compensating transmitter operative to transmit on respective channels defined by respective spreading codes selected from a set of quasi-orthogonal spreading codes, the set of quasi-orthogonal spreading codes including a first group of orthogonal spreading codes and a second group of orthogonal spreading codes, said transmitter further operative to generate an interference-compensated information symbol from a source information symbol based on knowledge of an information symbol and a code from the first group of codes used to generate a first coded signal and to concurrently transmit a second coded signal representing the interference-compensated information symbol encoded according to a code from the second group of codes.

34. The base station according to claim 33, wherein said transmitter comprises:
a composite signal generating circuit that encodes at least one first information symbol according to at least one code from the first group of codes to generate a composite signal; and
an interference-compensating coded signal generating circuit that integrates a product of the composite signal and a complex conjugate of the code from the second group of codes over a symbol interval, scales the integrated product by a scaling factor, and subtracts the scaled integrated product from the source information symbol to generate the interference-compensated information symbol.

35. The base station according to claim 34, wherein said interference-compensating coded signal generating circuit determines a first number of codes from the first group of codes and a second number of codes from the second group of codes to be used to transmit information symbols from the base station for the symbol interval and determines the scaling factor based on the determined first and second numbers.

36. The base station according to claim 33, wherein said transmitter concurrently transmits the first and second coded signals.

* * * * *